United States Patent [19]

Edwards

[11] Patent Number: 5,121,251
[45] Date of Patent: Jun. 9, 1992

[54] TELEMICROSCOPE WITH ABSORBING ANNULAR BAFFLE

[75] Inventor: D. Brandon Edwards, Virginia Beach, Va.

[73] Assignee: Edwards Optical Corporation, Virginia Beach, Va.

[21] Appl. No.: 650,446

[22] Filed: Feb. 4, 1991

Related U.S. Application Data

[63] Continuation-in-part of Ser. No. 343,030, Apr. 25, 1989, Pat. No. 5,004,332.

[51] Int. Cl.[5] ............ G02B 21/20; G02B 23/18; G02B 7/04; G02B 9/10
[52] U.S. Cl. .................... 359/368; 359/399; 359/481; 359/738; 359/744
[58] Field of Search ............... 350/507, 537, 547, 501, 350/276 R, 276 SL, 146, 319, 448, 449, 453; 351/158

[56] References Cited

U.S. PATENT DOCUMENTS

| | | | |
|---|---|---|---|
| 3,153,690 | 10/1964 | Kuyt et al. | 350/563 |
| 3,465,149 | 9/1969 | Flint | 250/83.3 |
| 3,488,103 | 1/1970 | Davis | 350/276 SL |
| 3,699,471 | 10/1972 | Mulready et al. | |
| 4,150,191 | 4/1979 | Karki | 350/276 SL |
| 4,367,010 | 1/1983 | Broome | 350/563 |
| 4,540,238 | 9/1985 | Edwards | 350/146 |
| 4,542,963 | 9/1985 | Linlor | 350/276 R |
| 4,598,981 | 1/1986 | Hallam et al. | 350/276 R |
| 4,831,258 | 5/1989 | Paulk et al. | 250/349 |
| 4,877,316 | 10/1989 | Edwards et al. | 350/537 |
| 5,004,332 | 4/1991 | Edwards | 350/146 |

FOREIGN PATENT DOCUMENTS

155976  1/1963  U.S.S.R. ............... 374/121

OTHER PUBLICATIONS

C. Leinert et al., "Stray Light Suppression...", *Applied Optics*, vol. 13, No. 3, Mar. 1974, pp. 556-562.
Smith, *Modern Optical Engineering*, New York: McGraw Hill, 1966, pp. 128-131.

*Primary Examiner*—Jon W. Henry
*Attorney, Agent, or Firm*—Hamilton, Brook, Smith & Reynolds

[57] ABSTRACT

A telemicroscope has a light absorbing and blocking annular baffle within the telemicroscope barrel. The baffle is positioned between the front and rear lenses and reduces glare in the telemicroscope by blocking and absorbing light which would ordinarily reflect off the inner surfaces of the telemicroscope barrel. The baffle has a knife-edge inner diameter and its surfaces are given a dull finish to enhance its light absorbing properties.

11 Claims, 3 Drawing Sheets

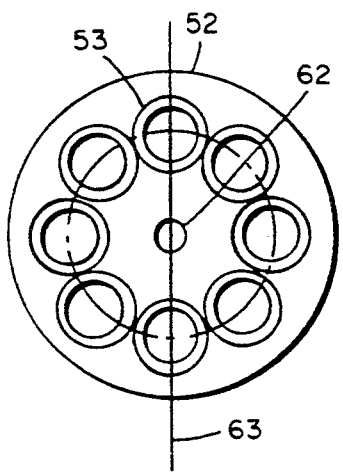 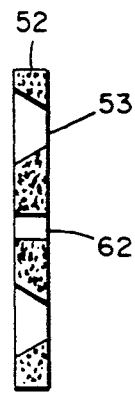
FIG. 6  FIG. 7
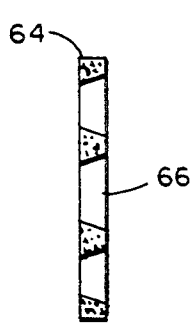 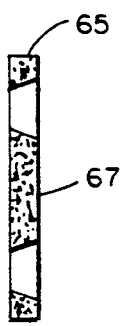
FIG. 8  FIG. 9
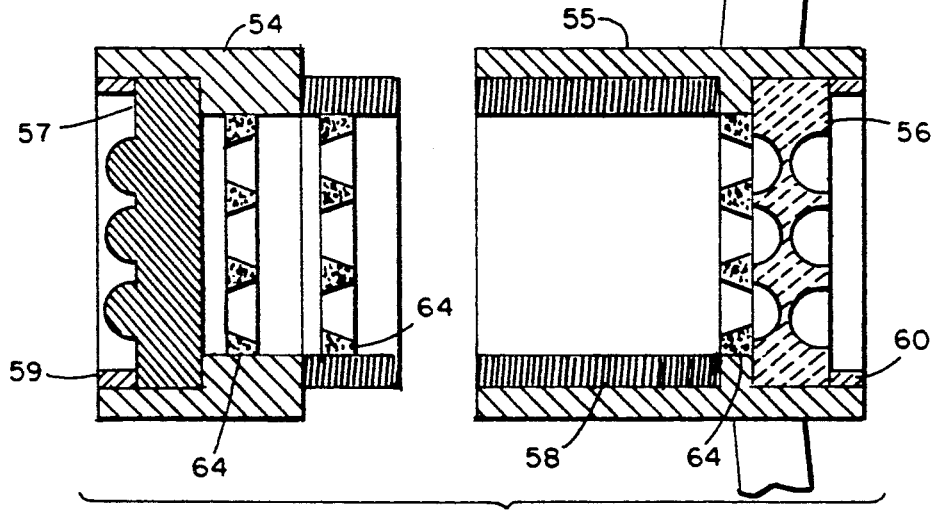
FIG. 10

TELEMICROSCOPE WITH ABSORBING ANNULAR BAFFLE

RELATED APPLICATION

This is a continuation-in-part of application number 07/343,030, filed Apr. 25, 1989, now U.S. Pat. No. 5,004,332.

BACKGROUND OF THE INVENTION

This invention relates to improvements in a telemicroscope such as that in the telemicroscopic apparatus previously disclosed and claimed in U.S. Pat. No. 4,540,238 to D. Brandon Edwards, and that described in U.S. Pat. No. 4,877,316 to D. Brandon Edwards et al. The term "telemicroscope" applies to both telescopes and microscopes. In a preferred implementation of the telemicroscopic apparatus disclosed in U.S. Pat. No. 4,540,238, a miniature telescope was mounted in a spectacle lens. With a sufficiently small telescope mounted at about the optic axis of the lens, one can obtain bilevel viewing in which a principle image and a small magnified image can be viewed without confusion.

In a preferred implementation of the telemicroscopic apparatus disclosed in U.S. Pat. No. 4,877,316, the telemicroscopic apparatus is placed at an angle relative to the optic axis of a spectacle lens. This allows a principle image and a clear magnified image of the same object to be viewed simultaneously.

One of the problems confronting many telemicroscopes is that of glare reaching the viewer's eye due to reflection of light off the inner surfaces of the telemicroscope barrel. This is a particular problem with miniature telescopes where the inside walls are very close to the central viewing axis of the scope barrel. One attempt at relieving this problem involves covering the inner surfaces of the barrel with small fibers which absorb much of the light reaching those surfaces. This approach is presented in the above-mentioned U.S. Pat. 4,877,316.

SUMMARY OF THE INVENTION

Although small fibers represent an effective way to control the glare, it is not the most efficient. In addition to any light that manages to pass through the fibers, additional glare is created by the reflection of light off the tips of the fibers themselves.

In accordance with this invention, a telemicroscope has a tubular barrel, and a front lens and rear lens fitting within the circumference of the barrel. The barrel of the telemicroscope may be formed of at least two portions coupled by screw threads. The two portions are adapted to be rotated relative to each other for focussing of the telemicroscope. A light absorbing annular baffle fits within the circumference of the barrel positioned between the front lens and the rear lens. The baffle has an outer diameter approximately equal to the inner diameter of the barrel which is preferably less than 16.0 millimeters. The inner surface of the baffle is tapered to an edge, and the baffle is given a dull finish to enhance its light absorbing properties. The inner diameter edge of the baffle is sharpened to a knife edge to reduce light reflection off that edge. In one variation, the baffle of the telemicroscope may be placed next to a lens to prevent light from passing through a portion of the lens surface.

The telemicroscope may be used in a telemicroscopic apparatus in which the telemicroscope is mounted to a carrier for positioning in front of a person's eye. Such a telemicroscopic apparatus is often a pair of spectacles in which the telemicroscope is mounted in a spectacle lens. By mounting the telemicroscope such that its central axis is tilted relative to the proper central line of sight through the carrier, a viewer is able to view and perceive a principal image of an object and a clear magnified image of the object simultaneously.

BRIEF DESCRIPTION OF THE DRAWINGS

FIG. 6 is a frontal view of a modular baffle disc to be employed with a modular or cluster telescope system.

FIG. 7 is a side cut-a-way view of the disc represented in FIG. 6.

FIG. 8 is a modular disc cut-a-way which would accommodate a cluster with a center mounted scope.

FIG. 9 is a modular disc cut-a-way with no center hole at all.

FIG. 10 is a representation of a modular telescope employing the modular disc.

DETAILED DESCRIPTION OF A PREFERRED EMBODIMENT

Figure 1:
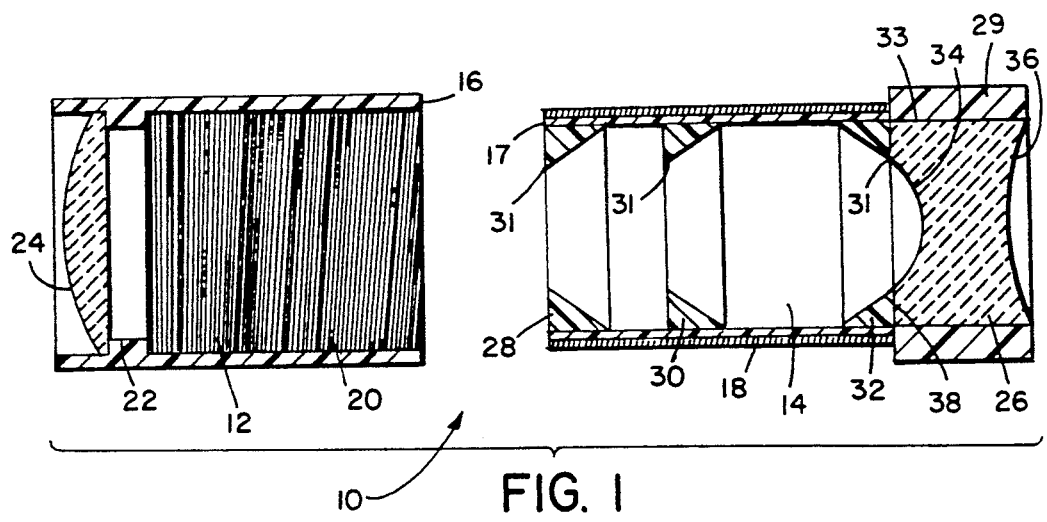
FIG. 1 is a cross-section of a telemicroscope having light absorbing baffles.

Shown in FIG. 1 is a cross section of a telemicroscope generally indicated 10. The telemicroscope 10 is in two connectable portions, a front tube 12 and a rear tube 14. A hard plastic casing 16, 17 forms the body of both telemicroscope tubes 12, 14. The casing 17 on the rear tube is partially surrounded by screw threads 18. Rear tube 14 is smaller in diameter than front tube 12, and the inner surface of the front tube 12 has screw threads 20 which mesh with the screw threads of the rear tube. The two tubes are connected and aligned by screwing rear tube 14 into front tube 12. This also provides a means by which to adjust the length of the telemicroscope 10.

Toward the front of front tube 12 is annular lip 22 formed on the plastic casing 16. Fitting tightly within the casing 16 and positioned against the front side of this lip 22 is positive lens 24. This lens works in conjunction with a negative lens 26 located toward the rear of rear tube 14. The outer circumference of the negative lens 33 is painted black to absorb light and thus minimize reflection from the sides of the lens. The plastic casing 17 of the rear tube has a thick portion 29 adjacent to the screw threads 16. The outer diameter of the thick portion 29 is roughly equal to the outer diameter of the casing 16 of the front tube 12.

Within the body of rear tube 14 are several annular baffles 28, 30, 32 which block and absorb light which reaches them. The side walls of the tube are very close to the central viewing axis of the telemicroscope 10.

Because of this, any light reflected from the side walls of the tube interferes with the view through the scope. In this system, reflected light is blocked and absorbed by the baffles 28, 30, 32 to prevent it from reaching the viewer's eye. The baffles are highly light absorbent, but are also angled in such a way that any light which is not initially absorbed by the baffle surfaces is trapped by the baffles to eventually be absorbed by them. By absorbing the light striking the side walls of the tube, the glare at the viewing port of the telemicroscope is reduced.

The outer diameter of each baffle 28, 30, 32 is such that the outer surface of each baffle is flush against the inner surface of tube 14. This prevents any light from leaking around the circumference of the baffles. The inner surface diameter of each baffle varies uniformly over the axial thickness of the baffle, intersecting the outer diameter at one side and decreasing linearly toward the other side. The inner surface of each baffle is thus a conic section. This varying inner diameter results in an edge at the intersection with a radial surface at the inner diameter. The conic surfaces of baffles 28 and 30 face rearwardly toward the negative lens 26.

As light enters through positive lens 24, some of the light stays within the central region of the telemicroscope, and some is directed toward the inner surfaces of the tubes. The light travelling directly through the tubes is undistorted and leaves the telemicroscope as part of a useful magnified image. Any light reflected off the side walls of the tubes, however, is distorted by a path change and becomes optical noise which appears to a viewer as annoying glare. In the present embodiment, the baffles 28, 30, 32 are positioned to block and absorb the light which does not stay within the central viewing aperture of the telemicroscope. Prior to insertion in the tube casing 16, the baffles 28, 30, 32 are placed in a tumbler with grit in order to dull the surface finish. The result is a dull gray or black finish which is highly light absorbent. The inner surface of casing 16 also has a light absorbent finish. Thus when light enters the telemicroscope, the portion of it diverging toward the sides of the tubes is absorbed and/or deflected away from the central viewing axis by the baffles 28, 30, 32.

The smallest inner radius of the baffles defines the aperture through which light propagates in the telemicroscope. A circular edge 31 is formed where the inner surface and the flat side surface of each baffle meet. During fabrication of the baffle, the circular edges 31 are machined to be sharp knife edges. If the edges are dull, light reflects off the edges and produces a certain amount of glare. By having the edges 31 as sharp as possible, this glare is reduced. It is therefore best that these edges be machined and not molded, as molding generally does not produce a sharp enough knife edge.

In the present embodiment, negative lens 26 has an internal surface 34 with a high degree of curvature, as may often be the case in a telemicroscope. The outer surface 36 has a much lower degree of curvature than the inner surface. The lens 26 extends to the inner surface of the tube 14. Because the inner curvature of the lens does not allow a useful diameter which matches the inner diameter of the tube, a flat annular region 38 of the lens 26 extends from the curved lens surface 34 to the inner surface of the tube. Since the flat surface 38 is not a lens consistent with system parameters, light must be prevented fom entering the lens 26 at the flat surface 38 to prevent unwanted optical noise from reaching the viewers eye.

Baffle 32 faces the opposite way of the other baffles in the system, and is used to prevent light from entering the negative lens 26 through the flat surface 38. The flat annular side of the baffle 32 is positioned next to the flat annular surface 38 of lens 26. The baffle is sized so that its annular surface is sufficient to block any light from reaching the flat surface 38 of lens 26.

The rear-most baffle serves as a field stop to control the field of view and the front baffle is an aperture stop which controls the brightness of the system. It is preferred that these baffles be close to the respective negative and positive lenses.

The baffles for the present embodiment are sized to fit the particular telemicroscope in question. A typical outside diameter for a telemicroscope, measured on the front tube 16, is 6.4 mm. Baffles used successfully in a 6.4 mm telemicroscope have had an outer diameter of 4.8 mm and an inner diameter of 3.6 mm. Another typical outside diameter for a telemicroscope is 15.9 mm. Baffles used successfully on a 15.9 mm telemicroscope have had an outer diameter of 12.7 mm and an inner diameter of 11.1 mm. In general, it has been determined that the baffle becomes much less efficient when the difference between the outer diameter and the inner diameter of the baffle is less than about 1.0 mm. Also the difference should generally be no greater than 4.0 mm.

Figure 2:
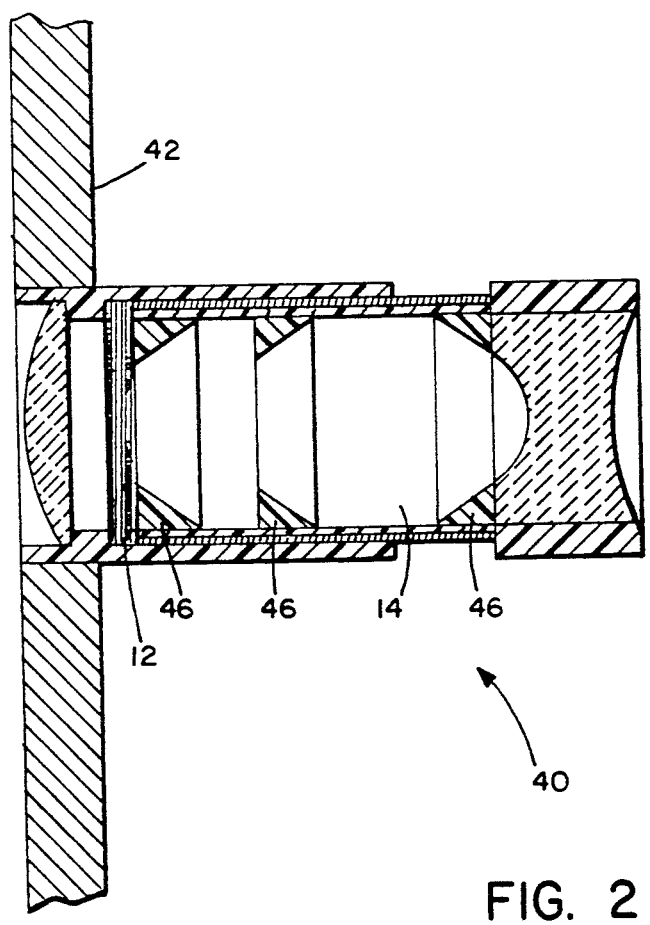
FIG. 2 is a side view of a telemicroscopic apparatus having a telemicroscope with light absorbing baffles mounted in a spectacle lens.

One embodiment of the present invention which is of particular interest involves the mounting of a telemicroscope with baffles on a carrier such as spectacle frames. FIG. 2 shows a side view of a telemicroscope 40 mounted in the lens 42 of a pair of spectacles. Two baffles 46 are spaced apart in the tube of the telemicroscope. The baffles will block and absorb light along the sides of the inside of the tube and reduce the glare reaching the eye of the wearer.

In an important application of the telemicroscope, simultaneous viewing of both magnified and non-magnified images is obtained. As discussed in U.S. Pat. No. 4,540,238 to Edwards and U.S. Pat. No. 4,877,316 to Edwards et al., this requires proper positioning of a telemicroscope mounted on a carrier such as the spectacle frames of FIG. 2. Although FIG. 2 depicts the telemicroscope 46 as having its central axis relatively perpendicular to the surface of lens 42, for simultaneous bilevel viewing the central axis of the telemicroscope should be angled relative to the proper central line of sight through the carrier. Edwards et al. show that the best results are achieved when the end of the telemicroscope closest to the eye is displaced further from the central line of sight than the opposite end. To be used in simultaneous viewing the outer diameter of the tubes 12 and 14 must be no greater than about 10.3 mm.

Figure 3:
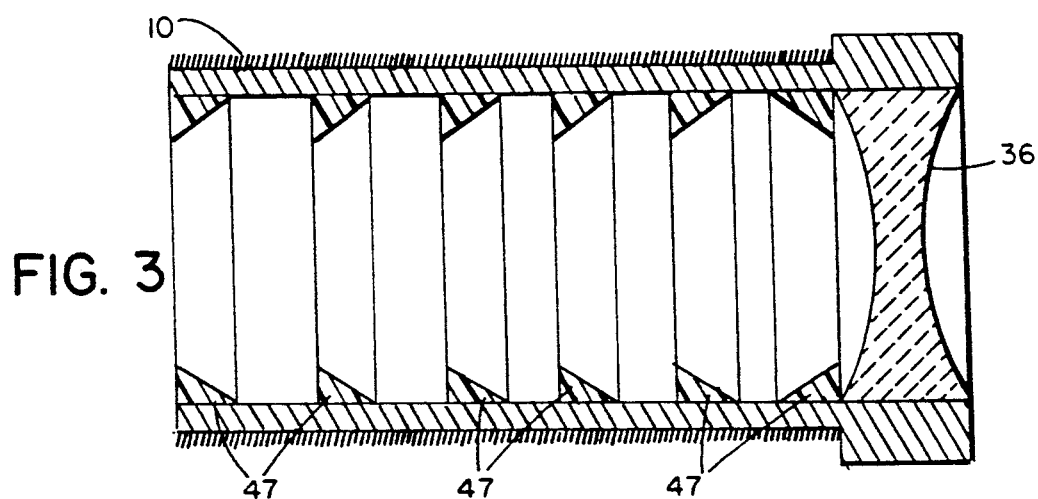
FIG. 3 is a cutaway cross-sectional view of a longer negative lens barrel illustrating a larger number of baffles.

It again can be emphasized that this invention describes baffle structures designed to eliminate internally reflected light and glare in miniature telescopes. Essentially these baffle structures are made to be mobile for ease of arrangement or positioning within the barrels of these scopes. And, as can be seen in FIG. 3, there may be several baffles inserted within the scope between the eyepiece and objective lenses. Basically the number of baffle structures to be used within a scope will be dictated by the distance between the two lenses. Generally the distances between lenses is determined by the power of the scope. FIG. 3 illustrates six separate baffle structures 47 which may be found in a six power miniature Galilean scope.

Figure 4:
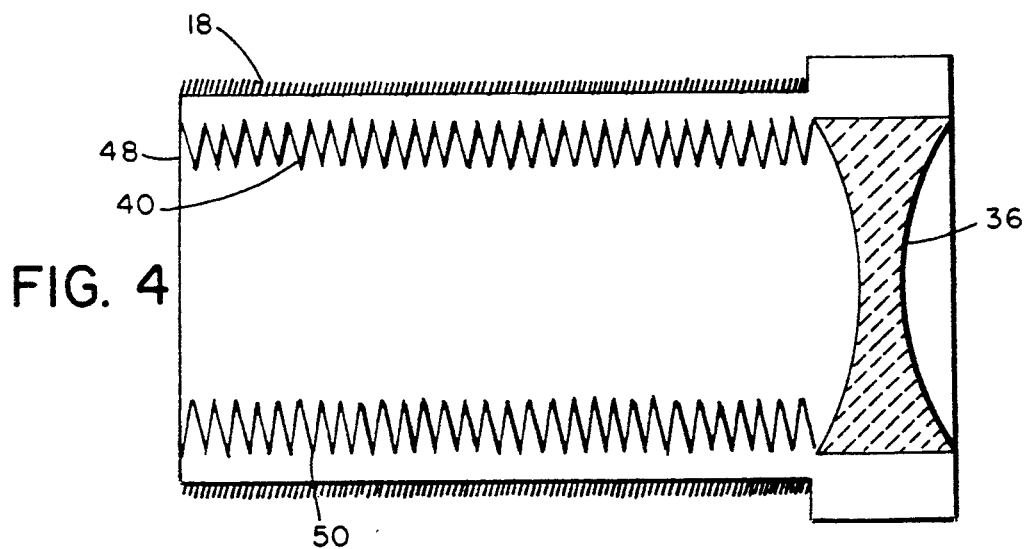
FIG. 4 is a cross-sectional cutaway illustration of a second possible baffling design with a thread-like baffling built into the inside wall of the negative lens scope barrel.

Making the baffling structure mobile does not preclude the use of stationary, built in baffling configurations between the objective and eyepiece lenses. FIG. 4 illustrates at 48 a baffle design which is of a thread-like nature. This type of baffling can be produced in at least two ways. A specially designed tapping tool with proper crest to root thread height and properly edged crest points can be used to cut this baffle or glare dampening structure as seen in FIG. 4. The bottom 50 of this thread-like baffle structure would be sufficiently far from the razor edged crest 49 so as to trap internally reflected light in a manner similar to the mobile baffle.

Figure 5:
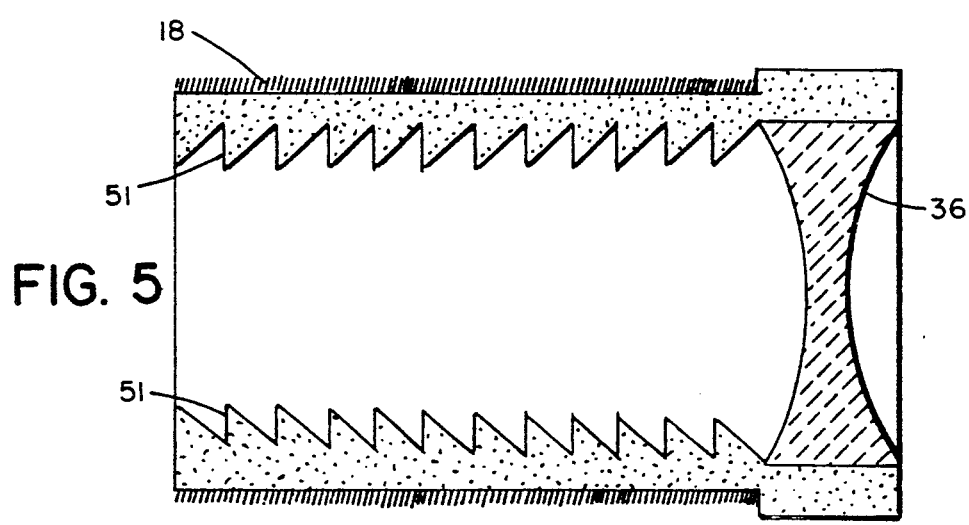
FIG. 5 represents a second cross-sectional cutaway view of an alternative baffle design of a buttress thread nature which as in FIG. 4 is attached or built into the inner wall of the eyepiece scope barrel.

FIG. 5 depicts another thread-like baffle structure formed along the inner wall of the scope barrel 18. This configuration may also be created using a specially designed tapping tool which would produce razor edged crests. This particular design is referred to as a buttress shape 51. This shape also more closely replicates the mobile baffle designs of FIGS. 1, 2 and 3. The designs of FIGS. 4 and 5 may also be created a second way through injection or other molding equipment. Once again, the difference between the crest internal diameters and the root-to-root diameters of a given scope barrel such as those of FIGS. 4 and 5 should be no less than 1 mm. Greater differences are employed as scope powers and diameters dictate.

This invention is designed to better accommodate the light entry control system which has been defined in U.S. Pat. No. 4,540,238 as a cluster system and herein is referred to also as a modular telescope system. This modular baffle disc is engineered to function in a manner similar to that of the single baffle miniature telescopes described above. However, in this particular application the baffle disc 52, FIGS. 6 and 7, contains a varied number of baffle like holes 53 designed to control internal light luminosity levels as well as internal telescope glare. This cluster or modular concept was originally designed to accommodate extreme visual loss in the vicinity of the central retinal zone of the eye. The modular of cluster formation with several individual miniature, small-exit pupil telescopes are essential in the processing of light for the peripheral portion of the retina. Targeting this peripheral vision with relatively high magnification is vital in the rehabilitation of individuals with pathologies such as Age Related Macular Degeneration.

As can be seen in U.S. Pat. No. 4,540,238, the original cluster system was comprised of a ring of several individual miniature telescopes surrounding a single telescope in the center of the cluster. This present invention, FIGS. 6-10, is designed to control luminosity levels and internal wall-reflected glare or stray light leaving the objective lenses and entering the eyepiece lenses. The cluster or modular baffle discs are engineered to function in conjunction with the telescope configurations generally and specifically described and claimed in U.S. Pat. Nos. 4,540,238 and 4,877,316.

As can be seen in FIG. 6, the general configuration of the modular baffle disc 52 comprises a symmetrically oriented ring of baffle-like holes 53 in a thin disc. A small hole 62, FIGS. 6 and 7, can be in the center of the disc. For macular degeneration patients this hole may provide a base level of nonimaging luminosity. The hole size would vary in diameter depending on the luminosity level acceptable for the best function of the particular individual using it. As can be seen in FIG. 9 at 67 there may be no hole at all. This baffle 65 would be used in a cluster telescope with no center modular miniature telescope. FIG. 8 represents a cut-a-way view of a baffle 64 which would accommodate a cluster telescope system with a ring of six to eight modular telescopes around one center, miniature modular telescope such as that illustrated in FIG. 10. The power and hence length of the modular telescope being used will dictate the number and location relative to each other to be used within the system.

FIG. 10 depicts the orientation and alignment of a six modular telescope ring. The telescope cluster is formed of molded objective element 57 with a molded matching ringed eyepiece element 56. Both these lens elements are held in the telescope barrels 54, 55 by retainer rings 59, 60, respectively. The entire unit is positioned before the eye in the spectacle lens, 61. The number of modular/cluster telescopes in the ring can vary from four to ten depending on the diameter of the cluster unit and the diameter of the individual modular units. In this example, three baffle rings 64 are shown, though the number may vary. The design of FIG. 10 allows for the thread 58 focusing of this modular/cluster system utilizing fine threading. The power of the modular/cluster systems can vary from 1.0× to 8.0×.

Cluster/modular miniature telescope systems coalesce or blend a modular picture as a result of having the center viewing axis of each telescope module at an outward angle to the center axis of the entire modular system. That is, the objective ends of the modular axes are further away from the system center axis than the eyepiece ends of the modular axes. This outward angle is roughly within the range of 0.5° to 4° for systems ranging from ½ inch system outer diameter to one inch system diameter with six to ten scopes.

While the invention has been shown and described with reference to preferred embodiments thereof, it will be understood by those skilled in the art that various changes in form and details may be made therein without departing from the spirit and scope of the invention as defined by the appended claims. In particular, baffles may be used in a number of telemicroscopes of different shapes and sizes to reduce the glare and optical noise reaching the output. The number of baffles used is also not crucial, with the optimum number and the appropriate dimensions being dependent on the application, and particularly the length and internal diameter of the telemicroscope. One to seven baffles have been used. For example, a single baffle scope is used for a night vision application, where the scope has one baffle positioned directly in the center of the main tube. Because the scope is susceptible to a different kind of glare than the ordinary scope, additional baffles are not necessary.

The use of a telemicroscope with baffles also applies to sights on a rifle or other small arm. The telemicroscope can be attached to a mounting bracket and mounted on a rifle such as the Colt Industries M-16 and AR-15 arms. The reduced glare in the rifle scope makes it easier to properly aim the weapon.

I claim:
1. A telemicroscope comprising:
   a barrel;
   a front lens and a rear lens fitting within the circumference of the barrel;
   an aperture stop and a field stop between the front lens and rear lens; and
   a light absorbing annular baffle fitting within the circumference of the barrel and being positioned between the aperture stop and the field stop, the baffle having an inner surface which tapers to an inner edge.

2. The telemicroscope of claim 1 wherein the surfaces of the baffle are given a dull finish to enhance the light absorbing properties of the baffle.

3. The telemicroscope of claim 1 wherein the baffle is sharpened to a knife edge along its smallest inner diameter.

4. The telemicroscope of claim 1 wherein the inner diameter of the baffle is less than about 16.0 mm.

5. The telemicroscope of claim 4 wherein the inner diameter of the baffle is greater than about 1.0 mm.

6. The telemicroscope of claim 1 comprising a cluster of telescopes comprising front lenses and rear lenses and baffles therebetween.

7. The telemicroscope of claim 1 wherein the baffle is positioned next to a lens and prevents light from passing through a peripheral portion of a surface of the lens.

8. The telemicroscope of claim 1 wherein the barrel is formed of at least two portions coupled by screw threads, the two portions being adapted to be rotated relative to each other for focusing of the telemicroscope.

9. The telemicroscope of claim 1 comprising a plurality of the baffles.

10. A telemicroscope comprising:

a tubular barrel having an inner diameter of less than about 16.0 mm;

a front lens and a rear lens fitting within the circumference of the barrel; and a plurality of light absorbing annular baffles fitting within the circumference of the barrel and being positioned between the front lens and the rear lens, each baffle having an outer diameter substantially equal to the inner diameter of the barrel and having an inner surface which tapers to an inner edge, the surfaces of each baffle having a dull finish to enhance the light absorbing properties of the baffle.

11. The telemicroscope of claim 10 further comprising a carrier to which the telemicroscope is mounted for positioning the telemicroscope in front of a person's eye, the telemicroscope being mounted such that the person is able to view and perceive a principal image of an object and a clear magnified image of the object simultaneously, the telemicroscope being mounted to the carrier at an angle such that the telemicroscope's central axis is angled relative to the proper central line of sight through the carrier, the end of the telemicroscope closest to the eye being displaced further from the central line of sight.

* * * * *